US012573745B2

(12) United States Patent
Chen et al.

(10) Patent No.: US 12,573,745 B2
(45) Date of Patent: Mar. 10, 2026

(54) BASE STATION ANTENNA

(71) Applicant: Outdoor Wireless Networks LLC, Claremont, NC (US)

(72) Inventors: Changfu Chen, Jiangsu (CN); Haifei Qin, Jiangsu (CN); Yuemin Li, Jiangsu (CN); Junfeng Yu, Jiangsu (CN); Long SHan, Jiangsu (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 173 days.

(21) Appl. No.: 18/484,960

(22) Filed: Oct. 11, 2023

(65) Prior Publication Data

US 2024/0145904 A1 May 2, 2024

(30) Foreign Application Priority Data

Oct. 17, 2022 (CN) ......................... 202211265118.8

(51) Int. Cl.
*H01Q 1/24* (2006.01)
*H01Q 1/48* (2006.01)
*H01Q 15/14* (2006.01)
*H01Q 21/26* (2006.01)

(52) U.S. Cl.
CPC ............... *H01Q 1/246* (2013.01); *H01Q 1/48* (2013.01); *H01Q 15/14* (2013.01); *H01Q 21/26* (2013.01)

(58) Field of Classification Search
CPC ........ H01Q 1/246; H01Q 15/14; H01Q 19/10; H01Q 21/00; H01Q 21/06; H01Q 21/24–26
See application file for complete search history.

(56) References Cited

U.S. PATENT DOCUMENTS

| | | | | |
|---|---|---|---|---|
| 9,590,317 | B2 * | 3/2017 | Zimmerman | H01Q 9/0478 |
| 10,158,165 | B2 * | 12/2018 | Sledkov | H01Q 1/246 |
| 10,511,088 | B2 * | 12/2019 | Xiao | H01Q 19/108 |
| 11,552,385 | B2 * | 1/2023 | Xiao | H01Q 1/48 |
| 11,652,301 | B2 * | 5/2023 | Yang | H01Q 19/005<br>343/700 MS |

* cited by examiner

*Primary Examiner* — Hasan Islam
(74) *Attorney, Agent, or Firm* — Myers Bigel, P.A.

(57) ABSTRACT

A base station antenna includes: a reflector; a first radiator located at the front side of the reflector; an ground conductor located at the rear side of the reflector, the ground conductor forming a chamber with an opening forward; and a first stripline conductor mounted in the chamber configured to feed the first radiator, the first stripline conductor extending in a plane substantially parallel to the reflector; where the reflector and the ground conductor are configured such that the opening is capped by the reflector, and the reflector is grounded via the ground conductor, so that the first stripline conductor and the ground conductor and the reflector are configured as a first strip transmission line.

20 Claims, 8 Drawing Sheets

BASE STATION ANTENNA

RELATED APPLICATION

The present application claims priority from and the benefit of Chinese Patent Application No. 202211265118.8, filed Oct. 17, 2022, the disclosure of which is hereby incorporated herein by reference in full.

FIELD OF THE INVENTION

The present disclosure generally relates to the field of radio communications, and more specifically, the present disclosure relates to a base station antenna.

BACKGROUND OF THE INVENTION

Wireless base stations are well known in the art, and generally include baseband units, radios, antennas and other components. Antennas are configured to provide bidirectional radio frequency ("RF") communication with fixed and mobile subscribers ("users") located throughout the cell. Generally, antennas are installed on towers or raised structures such as poles, roofs, water towers, etc., and separate baseband units and radio equipment are connected to the antennas.

FIG. 9 is a schematic structural diagram of a conventional base station 60. The base station 60 includes a base station antenna 50 that can be mounted on the convex structure 30. The base station 60 also includes base station devices such as the baseband unit 40 and the radio device 42. In order to simplify the drawing, a single baseband unit 40 and a single radio device 42 are shown in FIG. 9. However, it should be understood that more than one baseband unit 40 and/or radio 42 may be provided. In addition, although the radio device 42 is shown as being co-located with the baseband unit 40 at the bottom of the convex structure 30, it should be understood that in other cases, the radio device 42 may be a remote radio head mounted on the structure 30 adjacent to the antenna 50. The baseband unit 40 can receive data from another source, such as a backhaul network (not shown), and process the data and provide a data stream to the radio device 42. The radio device 42 can generate RF signals including data encoded therein and amplify and transmit these RF signals to the antenna 50 through the coaxial transmission line 44. It should also be understood that the base station 60 of FIG. 9 may generally include various other devices (not shown), such as a power supply, a backup battery, a power bus, an antenna interface signal group (AISG) controller, and the like. Generally, a base station antenna includes one or a plurality of phased arrays of radiating elements, wherein the radiating elements are arranged in one or a plurality of columns when the antenna is installed for use.

In order to transmit and receive RF signals to and from the defined coverage area, the antenna beam of the antenna 50 is usually inclined at a certain downward angle with respect to the horizontal plane (called "downtilt"). In some cases, the antenna 50 may be designed so that the "electronic downtilt" of the antenna 50 can be adjusted from a remote location. With the antenna 50 including such an electronic tilt capability, the physical orientation of the antenna 50 is fixed, but the effective tilt of the antenna beam can still be adjusted electronically, for example, by controlling phase shifters that adjust the phase of signals provided to each radiating element of the antenna 50. The phase shifter and other related circuits are usually built into the antenna 50 and can be controlled from a remote location. Typically, the AISG control signal is used to control the phase shifter.

Many different types of phase shifters are known in the art, including rotary wiper arm phase shifters, trombone style phase shifters, sliding dielectric phase shifters, and sliding metal phase shifters. The phase shifter is usually constructed together with the power divider as a part of the feeding network (or feeder component) for feeding the phased array. The power divider divides the RF signal input to the feed network into a plurality of sub-components, and the phase shifter applies a changeable respective phase shift to each sub-component so that each sub-component is fed to one or a plurality of radiators.

SUMMARY OF THE INVENTION

Therefore, the objective of the present disclosure is to provide a base station antenna capable of overcoming at least one drawback in the prior art.

According to a first aspect of the present disclosure, a base station antenna is provided, which includes: a reflector; a first radiator located at the front side of the reflector; an ground conductor located at the rear side of the reflector, the ground conductor forming a chamber with an opening forward; and a first stripline conductor mounted in the chamber configured to feed the first radiator, the first stripline conductor extending in a plane substantially parallel to the reflector; where the reflector and the ground conductor are configured such that the opening is capped by the reflector, and the reflector is grounded via the ground conductor, so that the first stripline conductor and the ground conductor and the reflector are configured as a first strip transmission line.

Through the following detailed description of exemplary embodiments of the present disclosure by referencing the attached drawings, other features and advantages of the present disclosure will become clear.

BRIEF DESCRIPTION OF THE DRAWINGS

The present disclosure will be explained in greater detail by means of specific embodiments with reference to the attached drawings. The schematic drawings are briefly described as follows.

Figure 1A:
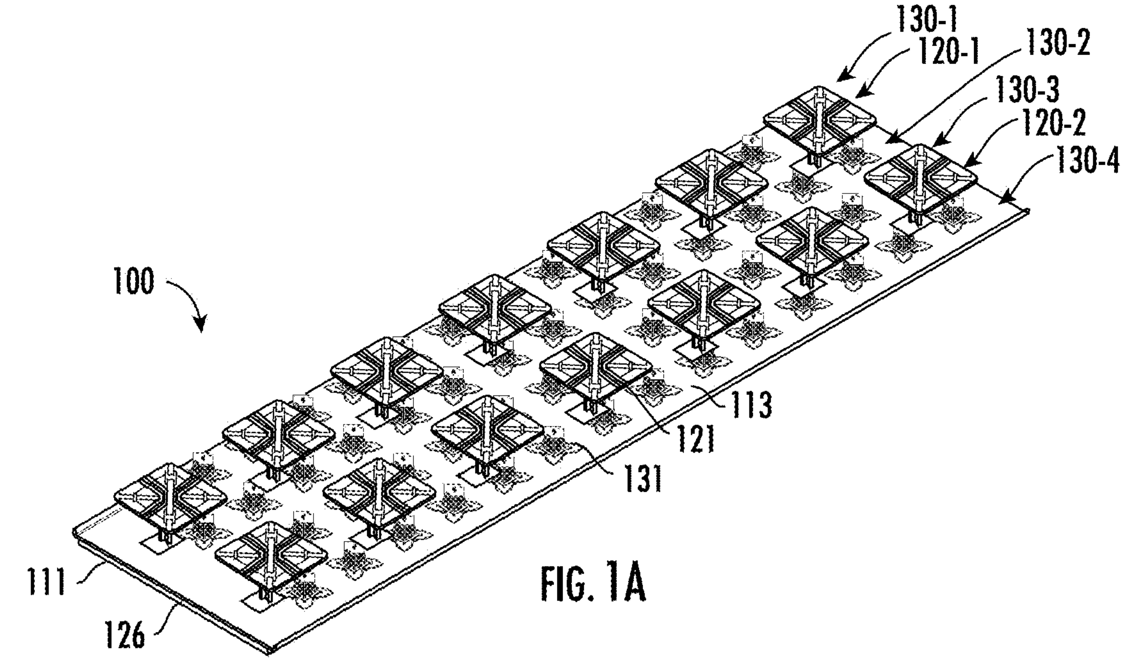
FIG. 1*a* shows a perspective view of a base station antenna assembly according to an embodiment of the present disclosure from the front side.

Note that in the embodiments described below, the same reference signs are sometimes jointly used between different attached drawings to denote the same parts or parts with the same functions, and repeated descriptions thereof are omitted. In some cases, similar labels and letters are used to indicate similar items. Therefore, once an item is defined in one attached drawing, it does not need to be further discussed in subsequent attached drawings.

For ease of understanding, the position, dimension, and range of each structure shown in the attached drawings and the like sometimes may not indicate the actual position, dimension, and range. Therefore, the present disclosure is not limited to the positions, dimensions, and ranges disclosed in the attached drawings and the like.

DETAILED DESCRIPTION OF SPECIFIC EMBODIMENTS

The present disclosure will be described below with reference to the attached drawings, wherein the attached drawings illustrate certain embodiments of the present disclosure. However, it should be understood that the present disclosure may be presented in many different ways and is not limited to the embodiments described below; in fact, the embodiments described below are intended to make the disclosure of the present disclosure more complete and to fully explain the protection scope of the present disclosure to those of ordinary skill in the art. It should also be understood that the embodiments disclosed in the present disclosure may be combined in various ways so as to provide more additional embodiments.

It should be understood that the terms used herein are only used to describe specific embodiments, and are not intended to limit the scope of the present disclosure. All terms used herein (including technical terms and scientific terms) have meanings normally understood by those skilled in the art unless otherwise defined. For brevity and/or clarity, well-known functions or structures may not be further described in detail.

As used herein, when an element is said to be "on" another element, "attached" to another element, "connected" to another element, "coupled" to another element, or "in contact with" another element, etc., the element may be directly on another element, attached to another element, connected to another element, coupled to another element, or in contact with another element, or an intermediate element may be present. In contrast, if an element is described as "directly" "on" another element, "directly attached" to another element, "directly connected" to another element, "directly coupled" to another element or "directly in contact with" another element, there will be no intermediate elements. As used herein, when one feature is arranged "adjacent" to another feature, it may mean that one feature has a part overlapping with the adjacent feature or a part located above or below the adjacent feature.

In this specification, elements, nodes or features that are "coupled" together may be mentioned. Unless explicitly stated otherwise, "coupled" means that one element/node/feature can be mechanically, electrically, logically or otherwise connected to another element/node/feature in a direct or indirect manner to allow interaction, even though the two features may not be directly connected. That is, "coupled" is intended to comprise direct and indirect connection of components or other features, including connection using one or a plurality of intermediate components.

As used herein, spatial relationship terms such as "upper", "lower", "left", "right", "front", "back", "high" and "low" can explain the relationship between one feature and another in the drawings. It should be understood that, in addition to the orientations shown in the attached drawings, the terms expressing spatial relations also comprise different orientations of a device in use or operation. For example, when a device in the attached drawings rotates reversely, the features originally described as being "below" other features now can be described as being "above" the other features. The device may also be oriented by other means (rotated by 90 degrees or at other locations), and at this time, a relative spatial relation will be explained accordingly.

As used herein, the term "A or B" comprises "A and B" and "A or B", not exclusively "A" or "B", unless otherwise specified.

As used herein, the term "exemplary" means "serving as an example, instance or explanation", not as a "model" to be accurately copied. Any realization method described exemplarily herein may not be necessarily interpreted as being preferable or advantageous over other realization methods. Furthermore, the present disclosure is not limited by any expressed or implied theory given in the above technical field, background art, summary of the invention or embodiments.

As used herein, the word "basically" means including any minor changes caused by design or manufacturing defects, device or component tolerances, environmental influences, and/or other factors. The word "basically" also allows for the divergence from the perfect or ideal situation due to parasitic effects, noise, and other practical considerations that may be present in the actual realization.

In addition, for reference purposes only, "first", "second" and similar terms may also be used herein, and thus are not intended to be limitative. For example, unless the context clearly indicates, the words "first", "second" and other such numerical words involving structures or elements do not imply a sequence or order.

It should also be understood that when the term "comprise/include" is used herein, it indicates the presence of the specified feature, entirety, step, operation, unit and/or component, but does not exclude the presence or addition of one or a plurality of other features, steps, operations, units and/or components and/or combinations thereof.

Figure 8A:
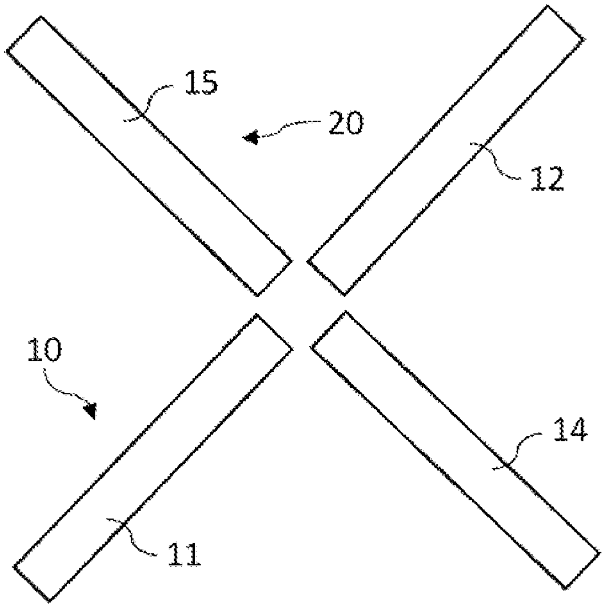
FIGS. 8*a* and 8*b* are schematic diagrams to illustrate radiators and feed conductors in a base station antenna assembly according to an embodiment of the present disclosure.
Figure 8B:
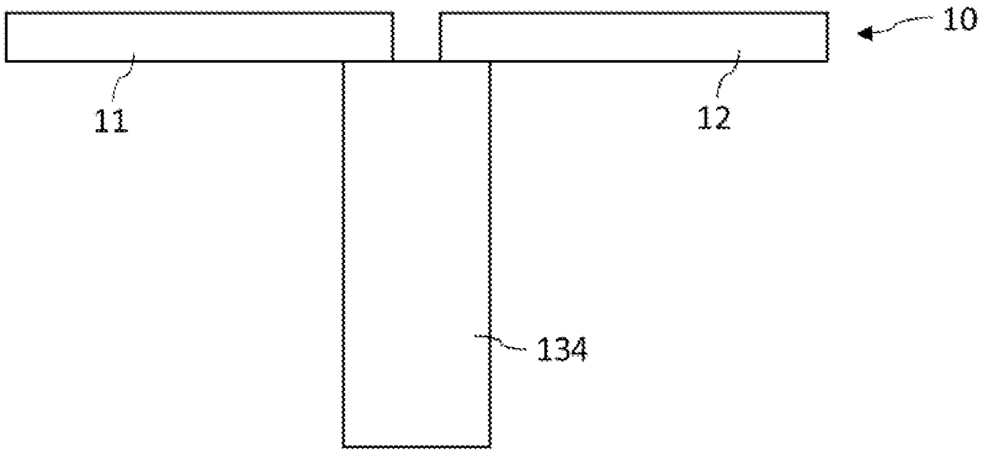
Figure 9:
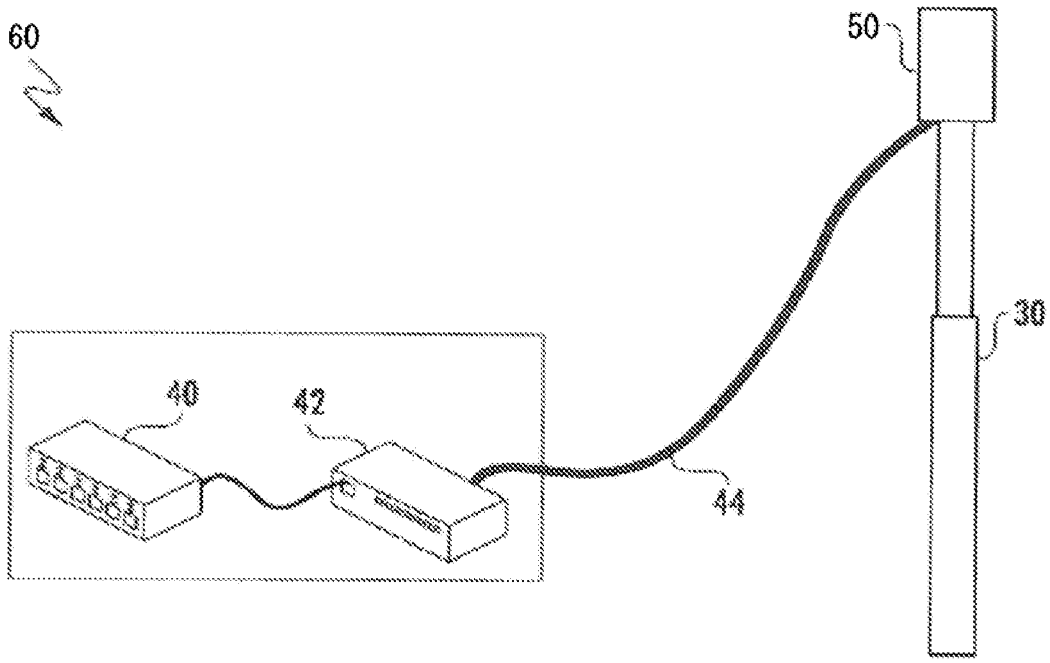
FIG. 9 is a schematic structural diagram of a conventional base station.

First, with reference to FIGS. 8*a* and 8*b*, as described herein, unless otherwise specified, "radiator" refers to a radiator including one or a plurality of radiating arms, such as a dipole radiator 10 including radiating arms 11 and 12 shown in FIG. 8*b*. "Radiating element," unless otherwise specified, refers to a radiating element that includes a radiator 10 and a support element 134 for the radiator 10 and a feed conductor (not shown). The support element 134 is used to position the radiator 10 at a predetermined position at the front side of the reflector. The feed conductor may be mechanically connected to the support element 134, and electrically connected to, for example, a phase-shifting circuit located on the rear side of the reflector and the radiator 10 located on the front side of the reflector, respectively, to feed the radiator 10. The feed conductor may, for example, include a feed balun for balance-unbalance conversion between the phase-shifting circuit and the radiator 10. The "dual-polarized radiating element" mentioned herein includes two radiating elements arranged orthogonally to each other, which may be, for example, a cross dipole radiating element shown in FIG. 8*a*, which includes a first radiator 10 and a second radiator 20 arranged crosswise. The first radiator 10 includes radiating arms 11 and 12, and the second radiator 20 includes radiating arms 14 and 15. For clarity and to not obscure the focus of the present disclosure, radiators 10 and 20 of the dual-polarized radiating element are not shown in some drawings (such as FIGS. 3*a* and 3*b*), but only the support element 134 and/or the feed conductor 132 are shown.

The present disclosure proposes a base station antenna, which includes a base station antenna assembly. The base station antenna assembly may be provided, for example, on the rear side of a radome. The base station antenna assembly includes a reflector; a first radiator located at the front side of the reflector; an ground conductor located at the rear side of the reflector, the ground conductor forming a chamber with an opening forward; and a first stripline conductor mounted in the chamber configured to feed the first radiator, the first stripline conductor extending in a plane substantially parallel to the reflector; where the reflector and the ground conductor are configured such that the opening is capped by the reflector, and the reflector is grounded via the ground conductor, so that the first stripline conductor and the ground conductor and the reflector are configured as a first strip transmission line.

According to the technical solution of the base station antenna according to the present disclosure, in one aspect, since the ground conductor forms a chamber with a forward opening, the first stripline conductor can be conveniently mounted into the chamber through the opening. In another aspect, the reflector and the ground conductor are manufactured as two separate components, which helps to re-disassemble the assembled reflector and ground conductor so as to adjust the first stripline conductor already mounted in the chamber through the opening. Moreover, the opening of the chamber can be capped by the reflector, which saves additional materials required for capping the opening and the mounting space required thereof. Furthermore, the first stripline conductor lies "flat" in the chamber parallel to the reflector, which allows the chamber to have a relatively small depth in a direction perpendicular to the reflector. Such an ground conductor for providing a chamber with a relatively small depth not only saves the mounting space and manufacturing material, but also facilitates manufacturing. This will be set forth in more detail below by means of FIGS. 1*a* to 7*b*.

Figure 1B:
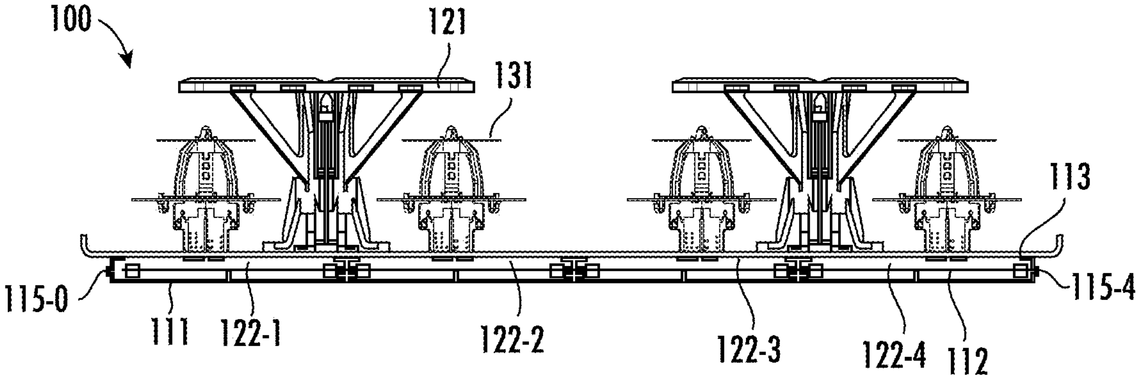
FIG. 1*b* is a bottom view of the base station antenna assembly of FIG. 1*a;*
Figure 2A:
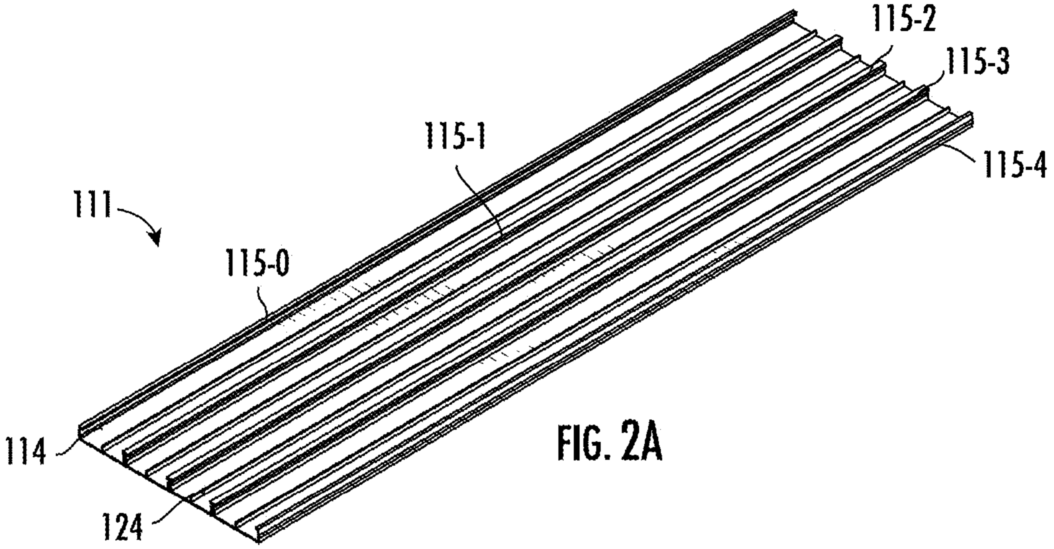
FIG. 2*a* is a perspective view of an ground conductor in the base station antenna assembly of FIG. 1*a;*
Figure 2B:
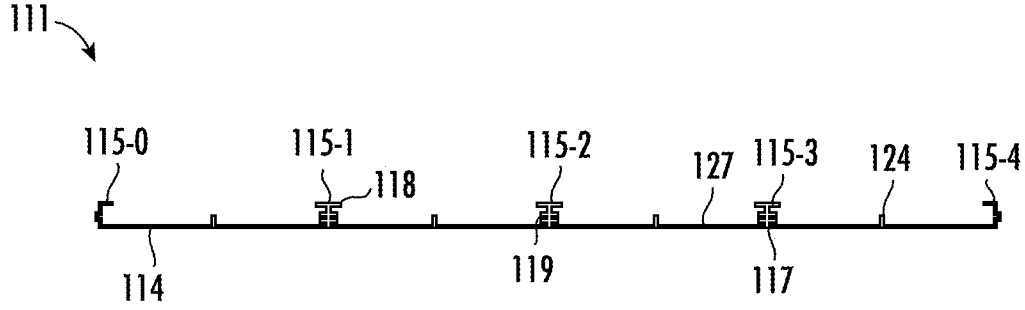
FIG. 2*b* is a bottom view of the ground conductor of FIG. 2*a;*

FIGS. 1*a* and 1*b* show a perspective view of a base station antenna assembly 100 according to an embodiment of the present disclosure, where FIG. 1*a* is a perspective view of the base station antenna assembly 100 from the front side, and FIG. 1*b* is a bottom view of the base station antenna assembly 100. FIG. 2*a* shows a perspective view of an ground conductor 111 in the base station antenna assembly 100 in FIG. 1. FIG. 2*b* shows a bottom view of the ground conductor 111 in FIG. 2*a*. The base station antenna assembly 100 includes a reflector 113, arrays 120 and 130 of radiating elements located on the front side of the reflector 113, and a phase shifter assembly located on the rear side of the reflector 113.

As shown in FIG. 1*a* and FIG. 1*b*, a plurality of dual-polarized radiating elements 121 and 131 are mounted on the front side of the reflector 113 of the base station antenna assembly 100. The reflector 113 may serve as the ground plane structure of the dual-polarized radiating elements 121 and 131. Each of the dual-polarized radiating elements 121 and 131 is mounted to extend forward from the front surface of the reflector 113 and includes a first radiator 10 and a second radiator 20 located on the front side of the reflector 113. The first radiator 10 is configured to receive and send radio frequency signals in a first polarization direction, such as a +45° polarization direction. The second radiator 20 is configured to receive and send radio frequency signals in a second polarization direction, such as a −45° polarization direction. The dual-polarized radiating element 121 has a relatively low operating frequency band (hereinafter referred to as a "low-band radiating element 121"), and the dual-polarized radiating element 131 has a relatively high operating frequency band (hereinafter referred to as a "high-band radiating element 131"). In the specific example shown in FIGS. 1*a* and 1*b*, the operating frequency band of the low-band radiating element 121 is 0.694-0.96 GHz, and the operating frequency band of the high-band radiating element 131 is 1.427-2.69 GHz.

In the illustrated embodiment, low-band radiating elements 121 are installed in two columns to form two linear arrays 120-1 and 120-2 of the low-band radiating elements 121. High-band radiating elements 131 are mounted in four columns to form four linear arrays 130-1 to 130-4 of the high-band radiating elements 131. It should be noted that similar elements may be individually referred to by their complete drawing reference numerals (e.g., linear array 120-1) or collectively referred to by the first part of their drawing reference numerals (e.g., linear array 120).

In some other embodiments not shown, the number of low-band radiating elements 121 and/or high-band radiating elements 131 and their linear arrays 120 and 130 may be different from the number shown in FIG. 1*a*. The linear arrays 120 and 130 may be arranged in any suitable inter-positional relationship, and may or may not extend the entire length of the base station antenna assembly 100. It should be understood that the technical content described below may be applicable to the low-band radiating element 121, the high-band radiating element 131 and/or radiating elements of other frequency band types within the scope understood by those skilled in the art.

As shown in FIG. 1*a* and FIG. 1*b*, an ground conductor 111 of a phase shifter assembly is mounted on the rear side of the reflector 113 of the base station antenna assembly 100. The ground conductor 111 may extend substantially over the entire length of the base station antenna assembly 100 in a longitudinal direction. The ground conductor 111 forms a chamber 122 with an opening (i.e., a forward opening) 127 (as shown in FIG. 2*b*) towards the reflector 113. By facing the opening 127 of the reflector 113, the stripline conductor 112 of the phase shifter assembly can be conveniently mounted into the chamber 122. In addition to the opening

127 towards the reflector 113, the ground conductor 111 may also form an end opening 126 at each of both ends in its longitudinal direction. The stripline conductor 112 may also be mounted into the chamber 122 via the end opening 126. The ground conductor 111 may be removably fixed on the reflector 113 by means of a threaded connector (such as a screw) or a clamp (such as a plastic clamp). When the ground conductor 111 is fixed on the reflector 113, the opening 127 is capped by the reflector 113 so that the chamber 122 becomes a substantially closed chamber 122. In this case, because the end opening 126 remains open, the stripline conductor 112 located in the chamber 122 can still be adjusted through the end opening 126. In some embodiments, the reflector 113 may be made of a metal sheet, such as sheet metal, by a stamping process. On the reflector 113, a plurality of holes or slots for elements in the base station antenna (such as a feed conductor 132, a pin, etc., as will be described below) may be stamped. A plurality of holes or slots may be introduced onto the reflector 113 by one stamping process.

A specific structure of the ground conductor 111 is shown in FIG. 2*a* and FIG. 2*b*. The ground conductor 111 may be integrally shaped based on the metal material using a pultrusion process, and may include a substrate 114 extending substantially parallel to the reflector 113 and a plurality of first coupling portions 115 integrally shaped on the substrate 114 (shown herein as five first coupling portions 115-0 to 115-4). The first coupling portion 115 protrudes (i.e. protrudes forward) from the substrate 114 towards the reflector 113 for engaging, and therefore electrically coupling, the ground conductor 111 to the reflector 113. Thus, the reflector 113 can be coupled and grounded via the ground conductor 111, so that the reflector 113 can provide a ground plane for the dual-polarized radiating elements 121 and 131. Since the reflector 113 is grounded via the ground conductor 111 without welding, it can have good passive intermodulation (PIM) performance.

In addition, the phase shifter component including the ground conductor 111 and the stripline conductor 112 is combined with the reflector 113, so that the stripline conductor 112 extends on the plane between the reflector 113 and the ground conductor 111, so that the stripline conductor 112 and the ground conductor 111 and the reflector 113 are configured as a strip transmission line to feed the radiator. Although not shown in the drawings, it should be understood that the phase shifter assembly may also include movable elements, such as slidable dielectric elements relative to the stripline conductor 112, and relative phase shift provided to the radiating elements is adjusted by changing the coverage area of the slidable dielectric elements to the stripline conductor 112, so that the strip transmission line is formed as a sliding dielectric phase shifter integrated with a power divider. Nevertheless, it should be understood that in other embodiments, the movable element may be a slider rotatable with respect to the stripline conductor 112, a "trombone" transmission line slidable with respect to the stripline conductor 112, or metal slidable with respect to the stripline conductor 112, so that the strip transmission line forms a rotary wiper arm phase shifter, a trombone-style phase shifter or a sliding metal phase shifter integrated with the power divider, respectively. Since the stripline conductor 112 is disposed within the substantially enclosed chamber 122, energy of RF signals transmitted on the stripline conductor 112 to radiate outside of the chamber can be reduced, while radiation interference outside of the chamber 122 can be reduced.

In some embodiments, as shown in FIGS. 1*b* to 2*b*, the first coupling portions 115 may be configured to extend parallel to each other along the length direction of the ground conductor 111 for dividing the chamber 122 into a plurality of sub-chambers side-by-side (in this example, four sub-chambers 122-1 to 122-4), and the stripline conductor 112 is installed in each sub-chamber. As such, mutual interference between the stripline conductors 112 located in different sub-chambers 122-1 to 122-4 can be mitigated. Two first coupling portions 115-0 and 115-4 located in a side region in the transverse direction of the substrate 114 may be used as side walls for defining the chamber 122 and as mechanical connection portions for securing to the reflector 113.

In some embodiments, the first coupling portion 115 may be configured as an elongated structure along the length direction of the ground conductor 111, and the elongated structure may have a T-shaped cross-section. In particular, the elongate structure may include a first portion (e.g., a support wall 117) extending (i.e., extending forward) from the substrate 114 towards the reflector 113 and a second portion (e.g., a coupling plate 118) disposed at the front end of the first portion. The support wall 117 may be configured to extend substantially perpendicular to the reflector 113. The coupling plate 118 may be configured to extend substantially parallel to the reflector 113, and be capacitively coupled to the reflector 113 via a dielectric layer (for example, it may be a polypropylene PP material), so that the reflector 113 is grounded via the ground conductor 111 without welding, thereby making the base station antenna have good passive intermodulation (PIM) performance. In order to ensure the effectiveness of the ground connection between the ground conductor 111 and the reflector 113, the thickness of the dielectric layer cannot be too thick. In a specific example, the thickness of the dielectric layer may be 0.1 mm to 0.2 mm. It may also be desirable to ensure that a coupling area between the ground conductor 111 and the reflector 113 is sufficient to realize that the ground conductor 111 and the reflector 113 can be effectively grounded in a capacitive coupling manner. In one specific example, each coupling plate 118 may have a transverse width of 12 mm to 15 mm.

In some embodiments, the stripline conductor 112 may be configured as a conductor line printed on the dielectric substrate, such as a PCB substrate. In these cases, the stripline conductor 112 may be conveniently manufactured by a PCB process. In order to fix the dielectric substrate printed with the stripline conductor 112, a card slot 119 extending along the length of the support wall may be provided on the support wall 117. Edges in the transverse direction of the dielectric substrate may be embedded in the card slot 119. As such, the dielectric substrate together with the stripline conductor 112 printed on the dielectric substrate can be fixed between two support walls 117. In some cases, for example, when the dielectric substrate has a larger width in the transverse direction, the ground conductor 111 further includes a support rib 124 formed integrally with the substrate 114 and protruding forward from the substrate 114 between two adjacent first coupling portions 115 for supporting the dielectric substrate printed with the stripline conductor 112.

Figure 3A:
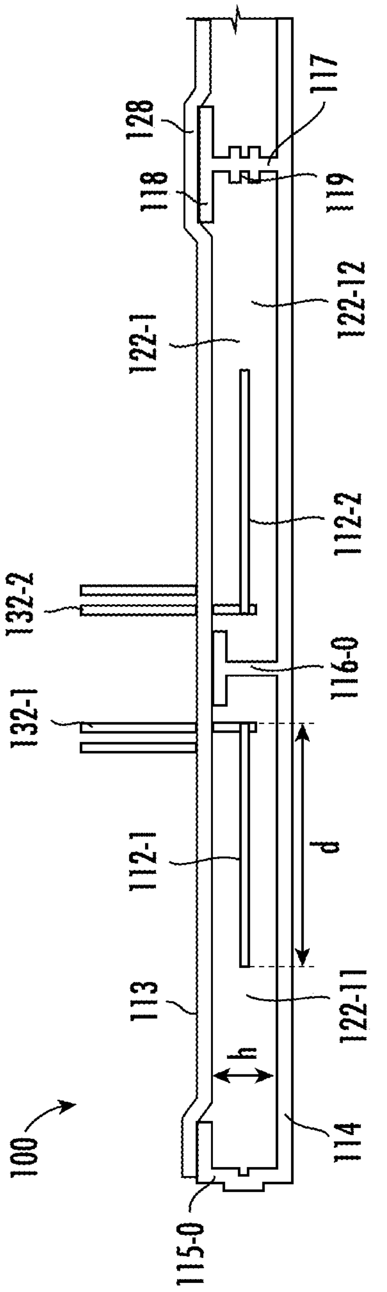
FIG. 3*a* is a schematic diagram of a portion of a base station antenna assembly at a first feed conductor and a second feed conductor according to an embodiment of the present disclosure.
Figure 7A:
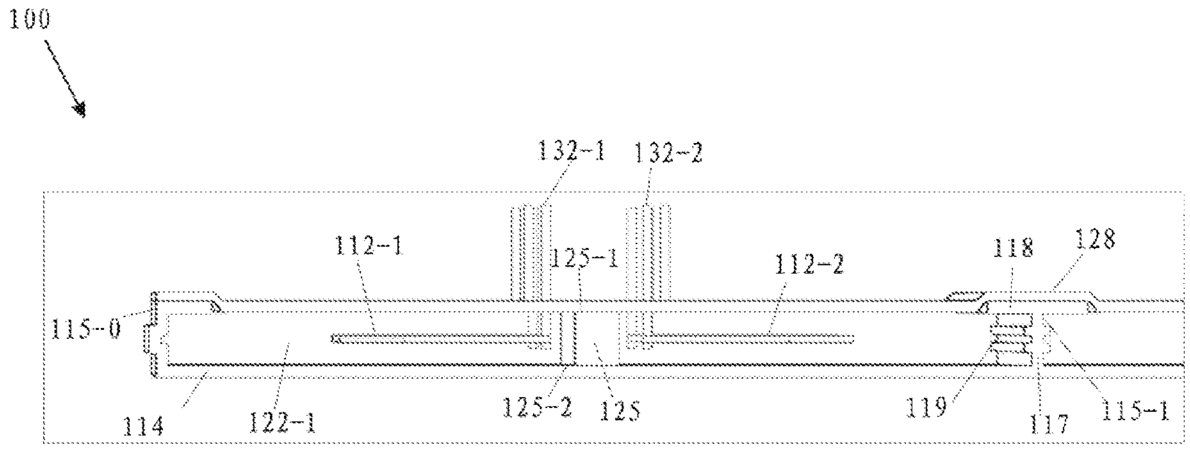
FIG. 7*a* is a schematic diagram of a portion of a base station antenna assembly at a first feed conductor and a second feed conductor according to an embodiment of the present disclosure.
Figure 7B:
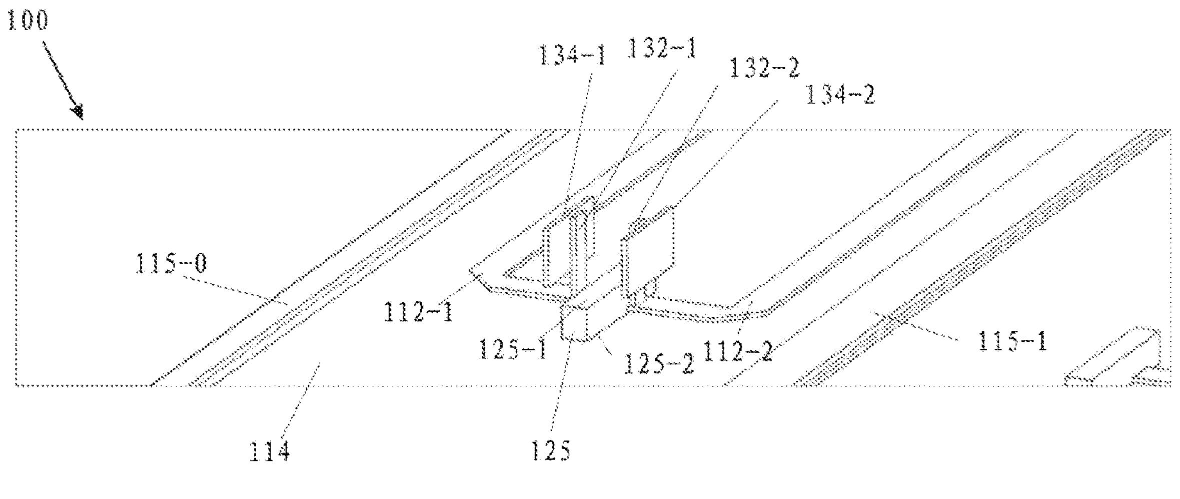
FIG. 7*b* is a perspective view of the portion of the base station antenna assembly in FIG. 7*a* from the front side, showing that the portion of the first feed conductor, the portion of the second feed conductor and the reflector are removed.

The stripline conductor 112 may include a first stripline conductor 112-1 and a second stripline conductor 112-2 (which can be seen more clearly in FIG. 3*a*, FIG. 7*a* and FIG. 7*b*). The first stripline conductor 112-1 and the second stripline conductor 112-2 may be placed adjacent in the width direction of the reflector 113, and are symmetrical about the axis along the length direction between the first stripline conductor 112-1 and the second stripline conductor 112-2. The first stripline conductor 112-1 is configured to feed the first radiator of the dual-polarized radiating element (for example, 121 or 131), and the second stripline conductor 112-2 is configured to feed the second radiator of the dual-polarized radiating element. The first stripline conductor 112-1 and the second stripline conductor 112-2 may extend in a plane substantially parallel to the reflector 113, so that the chamber 122 may have a smaller depth in a direction perpendicular to the reflector 113. Herein, "depth" may be understood as a distance h from the substrate 114 of the ground conductor 111 to the rear surface of the reflector 113. The distance h may be set to be less than, for example, 50%, 40%, 30%, 20%, 10%, etc. of the width d in the transverse direction of the first stripline conductor 112 (see FIG. 3*a* for the distance h and width d). In some embodiments, the distance h may be set to 4 mm to 20 mm, for example 6 mm to 9 mm.

Figure 3B:
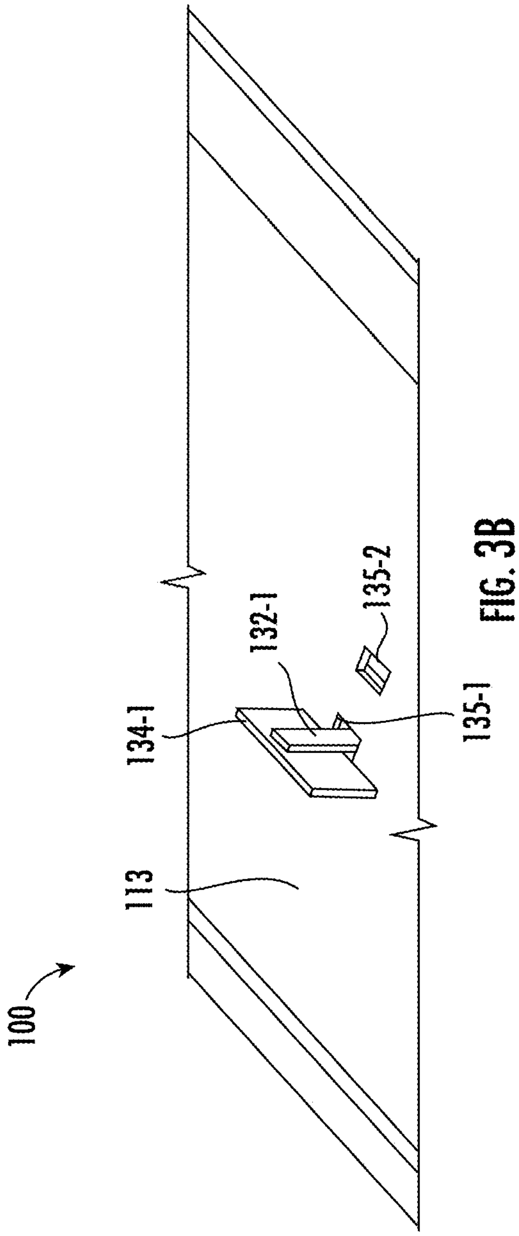
FIG. 3*b* is a perspective view of the portion of the base station antenna assembly in FIG. 3*a* from the front side, showing that the portion of the first feed conductor and the second feed conductor is removed.
Figure 4A:
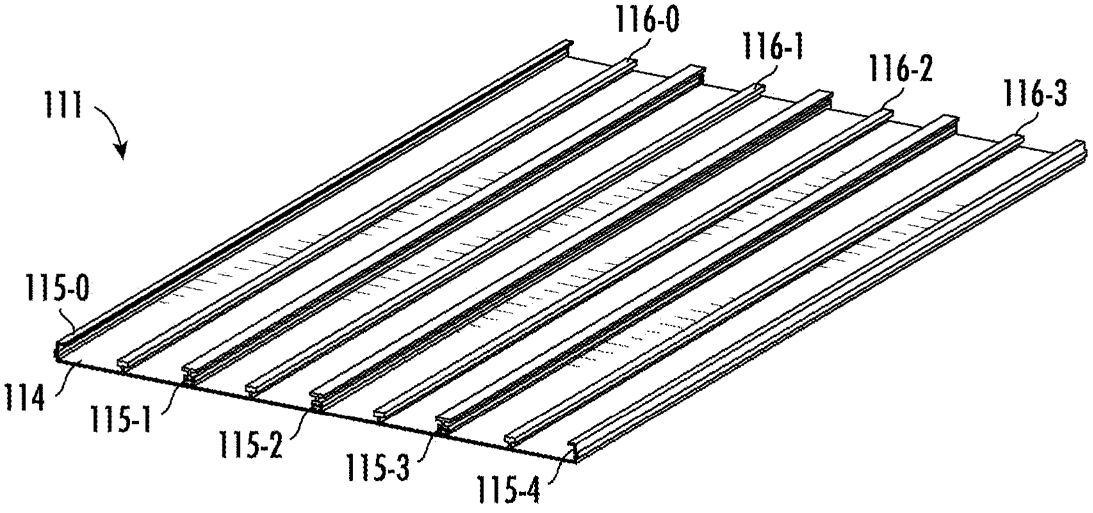
FIG. 4*a* is a perspective view of the ground conductor of the base station antenna assembly in FIG. 3*a;*
Figure 4B:
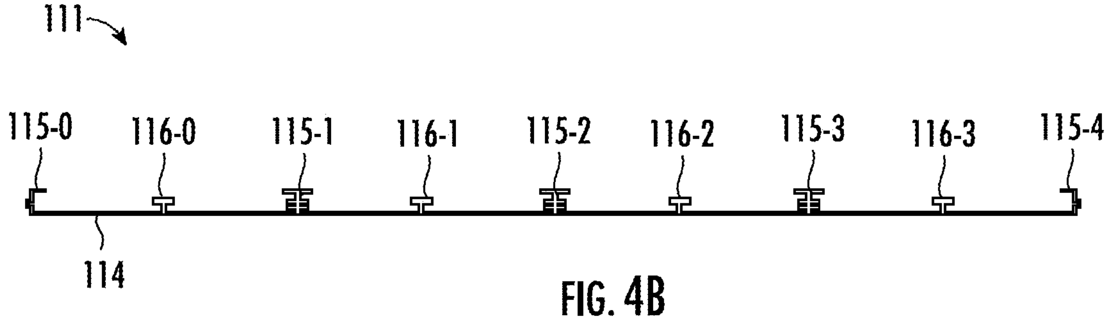
FIG. 4*b* is a bottom view of the ground conductor of FIG. 4*a;*
Figure 5:
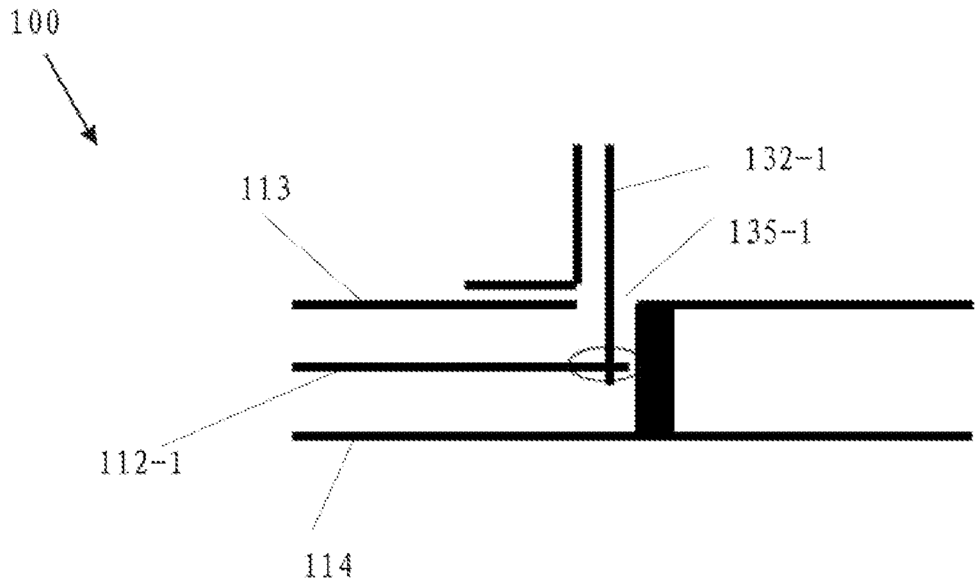
FIG. 5 is a simplified schematic diagram showing connection between a feeder conductor and an stripline conductor of a phase shifter assembly in a base station antenna assembly according to an embodiment of the present disclosure.

FIG. 3*a* shows a schematic diagram of a portion of the base station antenna assembly 100 at the first feed conductor 132-1 and the second feed conductor 132-2 according to an embodiment of the present disclosure. FIG. 3*b* shows a perspective view of the portion of the base station antenna assembly 100 in FIG. 3*a* from the front side, showing that the portion of the first feed conductor 132-1 and the second feed conductor 132-2 are removed. FIG. 4*a* shows a perspective view of the ground conductor 111 of the base station antenna assembly 100 in FIG. 3*a*. FIG. 4*b* shows a bottom view of the ground conductor 111 in FIG. 3*a*. FIG. 5 shows a simplified schematic diagram of connection between the first feed conductor 132-1 in the base station antenna assembly 100 and the stripline conductor 112 of the phase shifter assembly according to an embodiment of the present disclosure.

As shown in FIG. 3*a*, FIG. 4*a* and FIG. 4*b*, instead of the support rib 124, a second coupling portion 116 may be provided between two first coupling portions 115 of the ground conductor 111. In this embodiment, for example, as shown in FIG. 4*a* and FIG. 4*b*, a total of four second coupling portions 116-0 to 116-3 are provided on the substrate 114 of the ground conductor 111. In some embodiments not shown, the support rib 124 and the second coupling portion 116 may be provided simultaneously between two first coupling portions 115. The second coupling portion 116 is integrally shaped on the substrate 114 of the ground conductor 111 and protrudes from the substrate 114 towards the reflector 113 for coupling to the reflector 113. By providing the second coupling portion 116 between the first coupling portions 115, the coupling area between the ground conductor 111 and the reflector 113 can be further increased, thereby enhancing the coupling between the ground conductor 111 and the reflector 113. In order to achieve adjustment of the coupling strength, the second coupling area between the second coupling portion 116 and the reflector 113 may be configured to be smaller than the first coupling area between the first coupling portion 115 and the reflector 113. Similar to the first coupling portion 115, the second coupling portion 116 may also be configured as an elongated structure along the length direction of the ground conductor 111, and the elongated structure may have a T-shaped cross section. Further, the elongated structure may be configured for further dividing the sub-chamber 122-1 into two sub-spaces 122-11 and 122-12 side-by-side. The first stripline conductor 112-1 and the second stripline conductor 112-2 may be located in one of the subspaces 122-11 and 122-12, respectively.

Unlike the stripline conductor 112 in FIG. 1*b*, in the embodiment of FIG. 3*a*, both the first stripline conductor 112-1 and the second stripline conductor 112-2 are configured as sheet metal. The sheet metal has a greater thickness than a conductor trace printed on the dielectric substrate, so the first stripline conductor 112-1 and the second stripline conductor 112-2 in the embodiment shown in FIG. 3*a* have higher mechanical strength, which does not require the load carrying of the dielectric substrate, and can extend between the reflector 113 and the ground conductor 111 (for example, it can be supported by scattered or continuously distributed dielectric fillers). Specific structures of the first sheet metal and the second sheet metal are shown more clearly in FIG. 7*b*. The first sheet metal may extend along the length direction of the ground conductor 111 and is configured to feed a linear array arranged by the first radiators 10 of the dual-polarized radiating element having the first polarization direction. The second sheet metal may extend along the length direction of the ground conductor 111 and is configured to feed a linear array arranged by the second radiators 20 of the dual-polarized radiating element having the second polarization direction.

In order to realize the feeding for the first radiator 10, in addition to the first stripline conductor 112-1, the base station antenna assembly 100 further includes a first feed conductor 132-1 located on the front side of the reflector 113 for feeding the first radiator 10. As shown in FIG. 3*a* and FIG. 5, the first feed conductor 132-1 may be configured to pass at its rear through the first through hole 135-1 of the reflector 113 into the chamber 122, so as to be directly electrically connected to the first stripline conductor 112-1 by means of welding, for example (shown schematically by an oval in FIG. 5). As such, the first radiator 10 is electrically connected to the first stripline conductor 112-1 through the first feed conductor 132-1, and at most one such welding point may be required on the feed path from the first stripline conductor 112-1 to the first radiator 10. The first feeder conductor 132-1 may be arranged to be substantially perpendicular to the plane in which the first stripline conductor 112-1 is located. In order to achieve fixation, at least a portion of the first feed conductor 132-1 may be fixed on a first support element 134-1, such as a PCB substrate, for supporting the first radiator 10. Similarly, in order to feed the second radiator 20, in addition to the second stripline conductor 112-2, the base station antenna assembly 100 further includes a second feed conductor 132-2 located on the front side of the reflector 113 for feeding the second radiator 20. The second feed conductor 132-2 may be configured to enter the chamber 122 through a second through hole 135-2 of the reflector 113, thereby being electrically connected to the second stripline conductor 112-2 by means of welding, for example. As such, the second radiator 20 is electrically connected to the second stripline conductor 112-2 through the second feed conductor 132-2, and at most one such welding point is required on the feed path from the second stripline conductor 112-2 to the second radiator 20. The second feeder conductor 132-2 may be disposed substantially perpendicular to the plane in which the second stripline conductor 112-2 is located. In order to achieve fixation, at least a portion of the second feed conductor 132-2 may be fixed on the second support element 134-2, such as a PCB substrate, for supporting the second radiator 20. The first through-hole 135-1 and the second through-hole 135-2 may be introduced into the reflector 113 by one stamping process when stamping the reflector 113.

As shown in FIG. 3*a*, in order to facilitate mutual positioning of the reflector 113 with the first coupling portion 115, a groove 128 for inset with the coupling plate 118 of the first coupling portion 115 may be provided on the reflector 113.

Figure 6:
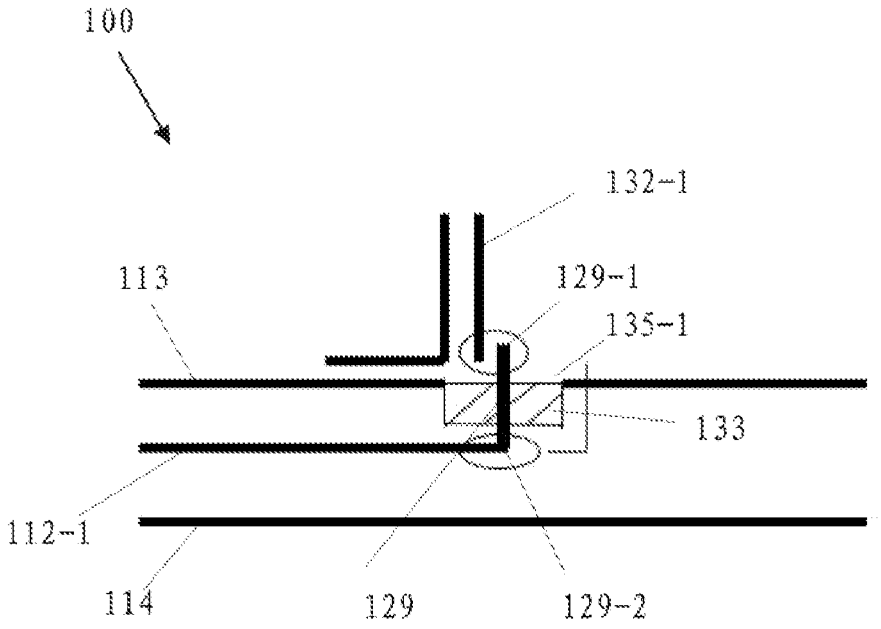
FIG. 6 is a simplified schematic diagram showing connection between a feeder conductor and an stripline conductor of a phase shifter assembly in a base station antenna assembly according to an embodiment of the present disclosure.

FIG. 6 shows a simplified schematic diagram of connection between the first feed conductor 132-1 and the stripline conductor of the phase shifting assembly in the base station antenna assembly 100 according to an embodiment of the present disclosure. Unlike the base station antenna assembly 100 in FIG. 5, in the embodiment of FIG. 6, the rear of the first feed conductor 132-1 is electrically connected to the first stripline conductor 112-1 by using an adapter 129, which extends through the first through hole 135-1 of the reflector 113. Herein, the adapter 129 may be configured as a pin. The pin may be fixed on the reflector 113 by using a dielectric support 133. A first end 129-1 of the pin is electrically connected to the first feed conductor 132-1 by, for example, welding (shown schematically by the oval in FIG. 6), and a second end 129-2 of the pin is electrically connected to the first stripline conductor 112-1 by, for example, welding (shown schematically by the oval in FIG. 6). Thus, the first radiator 10 is electrically connected to the first stripline conductor 112-1 through the first feed conductor 132-1 and the adapter 129.

FIG. 7*a* shows a schematic diagram of a portion of the base station antenna assembly 100 at the first feed conductor 132-1 and the second feed conductor 132-2 according to an embodiment of the present disclosure. FIG. 7*b* shows a perspective view of a portion of the base station antenna assembly 100 in FIG. 7*a* from the front side, showing that the portion of the first feed conductor 132-1, the portion of the second feed conductor 132-2 and the reflector 113 are removed.

Unlike the base station antenna in FIG. 3*a*, in the embodiment of FIG. 7*a*, instead of the first coupling portion 115, a current connection portion 125 is provided between the substrate 114 of the ground conductor 111 and the reflector 113 for electrically connecting the reflector 113 to the substrate 114 of the ground conductor 111, so that the reflector 113 is grounded via the ground conductor 111. In order to provide acceptable passive intermodulation (PIM) performance of the base station antenna, the current connection portion 125 may be configured as a plurality of dispersed conductor blocks (for example, metal blocks). An upper surface 125-1 of the metal block is in direct contact with the reflector 113, and a lower surface 125-2 of the metal block is in direct contact with the substrate 114 of the ground conductor 111 to realize the respective current connection. The plurality of metal blocks may be linearly arranged along the length direction of the ground conductor 111, and may be fixed on the substrate 114 of the ground conductor 111 by means of a threaded connector (for example, a screw).

In some embodiments not shown, the ground conductor 111 may alternatively be manufactured from a metal sheet, such as sheet metal, by a stamping process.

The base station antenna assembly 100 according to the various embodiments of the present disclosure is capable of bringing one or more of the following advantages: First, the chamber 122 has the opening 127 towards the reflector 113, which helps to mount the stripline conductor 112 into the chamber 122 or helps to adjust the stripline conductor 112 already mounted in the chamber 122; second, the opening 127 of the chamber 122 can be capped by the reflector 113, which saves additional materials required for capping the opening 127 and the mounting space required, thereby simplifying the structure of the base station antenna; third, the stripline conductor 112 is arranged parallel to the reflector 113 in the chamber 122 formed by the ground conductor 111, which allows the chamber 122 to have a smaller depth, thereby reducing the mounting space and manufacturing material of the ground conductor 111 and making it easy to manufacture; fourth, the reflector 113 is manufactured by using a stamping process, and a plurality of holes or slots for allowing the element to passing through may be introduced into the reflector 113 by using one stamping process, instead of using a computer numerical control (CNC) process to form a hole or slot for allowing the element to pass through on the chamber element of the phase shifter assembly formed by using a pultrusion process. This not only reduces manufacturing costs and manufacturing time, but also supports flexible forming of the hole or slot. Fifth, the reflector 113 is grounded via the first coupling portion 115 or the current connection portion 125 of the ground conductor 111, instead of welding, so that the base station antenna can have better passive intermodulation (PIM) performance.

The invention claimed is:

1. A base station antenna, comprising:
a reflector;
a plurality of radiators located at a front side of the reflector;
a ground conductor located at a rear side of the reflector, the ground conductor forming a chamber with an opening forward toward the reflector; and
a first stripline conductor mounted in the chamber configured to feed the plurality of radiators, the first stripline conductor extending in a plane substantially parallel to the reflector, the first stripline conductor and the ground conductor forming a phase shifter;
wherein the reflector and the ground conductor are configured such that the opening is capped by the reflector, and the reflector is grounded via the ground conductor, so that the first stripline conductor and the ground conductor and the reflector are configured as a first strip transmission line; and
wherein the base station antenna further comprises a first feed conductor located on the front side of the reflector for feeding a first radiator of the plurality of radiators and an adapter provided through the reflector, and a rear portion of the first feed conductor is electrically connected to the first stripline conductor by means of the adapter.

2. The base station antenna according to claim 1, wherein the ground conductor comprises:
a substrate extending substantially parallel to the reflector; and
a plurality of coupling portions integrally formed with the substrate and protruding forward from the substrate, the plurality of coupling portions configured to couple the ground conductor to the reflector.

3. The base station antenna according to claim 2, wherein each coupling portion of the plurality of coupling portions is configured as an elongated structure extending along a length direction of the ground conductor.

4. The base station antenna according to claim 3, wherein the plurality of coupling portions divide the chamber into a plurality of sub-chambers side-by-side,
the plurality of radiators comprises a plurality of first radiators, and
the first stripline conductor comprises a plurality of first stripline conductors,
wherein the plurality of first stripline conductors are respectively mounted in the corresponding plurality of sub-chambers to feed the corresponding plurality of first radiators.

5. The base station antenna according to claim 3, wherein each coupling portion of the plurality of coupling portions comprises:

a first portion extending forward from the substrate; and a second portion extending substantially parallel to the reflector at the front end of the first portion.

6. The base station antenna according to claim 2, wherein the ground conductor further comprises:

a support rib formed integrally with the substrate and protruding forward from the substrate between two adjacent coupling portions of the plurality of coupling portions, the support rib configured to support the first stripline conductor.

7. The base station antenna according to claim 1, wherein the ground conductor comprises a substrate extending substantially parallel to the reflector, and the base station antenna further comprises a current connection portion disposed between the substrate and the reflector, and the current connection portion is configured to electrically connect the reflector to the substrate so that the reflector is grounded via the ground conductor.

8. The base station antenna according to claim 7, wherein the current connection portion is configured as a plurality of dispersed conductor blocks.

9. The base station antenna according to claim 7, wherein the current connection portion is fixed on the substrate by means of a threaded connection member.

10. The base station antenna according to claim 1, wherein the base station antenna further comprises a first feed conductor located on the front side of the reflector for feeding the first radiator, and the first feed conductor is configured to be electrically connected to the first stripline conductor when a rear portion thereof enters the chamber through the reflector.

11. The base station antenna according to claim 1, wherein the adapter is configured as a pin, and the pin is fixed on the reflector by means of a dielectric support.

12. The base station antenna according to claim 1, wherein the first stripline conductor is a conductor line printed on a dielectric substrate.

13. The base station antenna according to claim 1, wherein the first stripline conductor is sheet metal.

14. The base station antenna according to claim 1, wherein the ground conductor is integrally formed based on a metal material using a pultrusion process, or the ground conductor is manufactured from a metal sheet through a stamping process.

15. The base station antenna according to claim 1, wherein the reflector is manufactured by a stamping process.

16. The base station antenna according to claim 15, wherein a hole or slot is stamped on the reflector for elements of the base station antenna to pass through.

17. The base station antenna according to claim 1, wherein the base station antenna further comprises:

a second radiator located at the front side of the reflector, wherein the first and second radiators are correspondingly configured to transmit and receive radio frequency signals along first and second polarization directions; and a second stripline conductor mounted in the chamber configured to feed the second radiator, the second stripline conductor extending in a plane substantially parallel to the reflector, and the second stripline conductor and the ground conductor and the reflector being configured as a second strip transmission line, wherein the first stripline conductor and the second stripline conductor are placed adjacent in a width direction of the reflector.

18. The base station antenna according to claim 1, wherein the ground conductor extends substantially over an entire length of the base station antenna.

19. The base station antenna according to claim 2, wherein a distance from the substrate of the ground conductor to the rear surface of the reflector is less than 20% of a width in a transverse direction of the first stripline conductor.

20. A base station antenna, comprising:

a reflector;

a plurality of radiators located at a front side of the reflector;

a ground conductor located at a rear side of the reflector, the ground conductor forming a chamber with an opening forward toward the reflector; and a first stripline conductor mounted in the chamber configured to feed the plurality of radiators, the first stripline conductor extending in a plane substantially parallel to the reflector, the first stripline conductor and the ground conductor forming a phase shifter;

wherein the reflector and the ground conductor are configured such that the opening is capped by the reflector, and the reflector is grounded via the ground conductor, so that the first stripline conductor and the ground conductor and the reflector are configured as a first strip transmission line;

wherein the ground conductor comprises:

a substrate extending substantially parallel to the reflector; and a plurality of coupling portions integrally formed with the substrate and protruding forward from the substrate, the plurality of coupling portions configured to couple the ground conductor to the reflector; and wherein each coupling portion of the plurality of coupling portions is configured as an elongated structure extending along a length direction of the ground conductor.

* * * * *